United States Patent
Pitzel et al.

(10) Patent No.: US 7,062,765 B1
(45) Date of Patent: Jun. 13, 2006

(54) SYSTEM AND METHOD FOR UPDATING INFORMATION VIA A NETWORK

(75) Inventors: Bradley John Pitzel, Seattle, WA (US); Stanislav Bobrovskiy, Lake Forest Park, WA (US); William A. Roberts, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 0 days.

(21) Appl. No.: 09/318,438

(22) Filed: May 25, 1999

(51) Int. Cl.
*G06F 9/445* (2006.01)
*G06F 15/16* (2006.01)
*G06F 9/44* (2006.01)

(52) U.S. Cl. ............... 717/177; 709/201; 709/203; 717/175; 717/176; 717/178; 717/168

(58) Field of Classification Search ............ 717/1, 717/11, 168–178, 125, 103; 709/220, 223, 709/201, 203; 713/1, 178; 711/133
See application file for complete search history.

(56) References Cited

U.S. PATENT DOCUMENTS

| | | | | |
|---|---|---|---|---|
| 4,558,413 A | * | 12/1985 | Schmidt et al. .............. | 707/203 |
| 5,019,963 A | | 5/1991 | Alderson et al. ........... | 364/200 |
| 5,155,847 A | | 10/1992 | Kirouac et al. ............. | 395/600 |
| 5,247,683 A | | 9/1993 | Holmes et al. ............. | 395/700 |
| 5,339,432 A | * | 8/1994 | Crick ........................... | 713/1 |
| 5,408,619 A | | 4/1995 | Oran ........................... | 395/325 |
| 5,421,009 A | | 5/1995 | Platt ............................ | 395/600 |
| 5,421,017 A | | 5/1995 | Scholz et al. ............... | 395/700 |
| 5,457,778 A | * | 10/1995 | Sieffert ........................ | 345/501 |
| 5,473,772 A | | 12/1995 | Halliwell et al. ........... | 395/650 |
| 5,493,728 A | | 2/1996 | Solton et al. ............... | 395/250 |
| 5,537,596 A | | 7/1996 | Yu et al. ..................... | 395/700 |
| 5,557,798 A | | 9/1996 | Skeen et al. ................ | 395/650 |
| 5,602,582 A | | 2/1997 | Wanderscheid et al. ...... | 348/12 |
| 5,619,716 A | | 4/1997 | Nonaka et al. ............. | 395/800 |
| 5,666,293 A | | 9/1997 | Metz et al. ................ | 395/200.5 |
| 5,682,533 A | | 10/1997 | Siljestroemer .............. | 395/616 |
| 5,696,898 A | | 12/1997 | Baker et al. ........... | 395/187.01 |
| 5,706,435 A | | 1/1998 | Barbara et al. ......... | 395/200.09 |
| 5,710,884 A | | 1/1998 | Dedrick .................. | 395/200.47 |
| 5,717,923 A | | 2/1998 | Dedrick ...................... | 395/613 |
| 5,732,275 A | | 3/1998 | Kullick et al. .............. | 395/712 |

(Continued)

OTHER PUBLICATIONS

TITLE: Client-Server Computing, author: Alok Sinha, ACM, Jul. 1992.*
TITLE: Managing Update Conflicts in Bayou, A Weakly Connected Replicated Storage System, author: Terry et al, ACM, 1995.*

(Continued)

*Primary Examiner*—Chameli C. Das
(74) *Attorney, Agent, or Firm*—Steven C. Stewart, RealNetworks, Inc.

(57) ABSTRACT

The present invention includes a system and a method for updating components in a client computer. The invention includes a method for upgrading software for various users, each of the users having diverse hardware and software configurations. The invention includes a method for automatically determining the hardware and software configuration of the client computer without user intervention. To begin the upgrade, the client computer reads a configuration file that identifies the components for downloading. Upon receipt of the configuration file, the client computer determines the hardware and software configuration of the client computer. The client computer automatically communicates with a component server via a network and requests one or more components for downloading to the client computer based upon the configuration file and the hardware and software conditions of the client computer.

51 Claims, 7 Drawing Sheets

U.S. PATENT DOCUMENTS

| | | | |
|---|---|---|---|
| 5,734,898 A | 3/1998 | He | 395/619 |
| 5,740,549 A | 4/1998 | Reilly et al. | 705/14 |
| 5,742,829 A | 4/1998 | Davis et al. | 395/712 |
| 5,752,042 A | 5/1998 | Cole et al. | 395/172 |
| 5,758,342 A | 5/1998 | Gregerson | 707/10 |
| 5,764,992 A | 6/1998 | Kullick et al. | 395/712 |
| 5,768,539 A | 6/1998 | Metz et al. | 395/200.79 |
| 5,790,796 A | 8/1998 | Sadowsky | 395/200.51 |
| 5,790,856 A | 8/1998 | Lillich | 395/703 |
| 5,805,824 A | 9/1998 | Kappe | 395/200 |
| 5,809,251 A | 9/1998 | May et al. | 395/200.53 |
| 5,809,287 A | 9/1998 | Stupek et al. | 395/500 |
| 5,826,253 A | 10/1998 | Bredenberg | 707/2 |
| 5,832,275 A | 11/1998 | Olds | 395/712 |
| 5,832,487 A | 11/1998 | Olds et al. | 707/10 |
| 5,838,314 A | 11/1998 | Neel et al. | 345/327 |
| 5,845,077 A | 12/1998 | Fawcett | 395/200.51 |
| 5,845,090 A | 12/1998 | Collins, III et al. | 395/200.51 |
| 5,848,397 A | 12/1998 | Marsh et al. | 705/14 |
| 5,850,518 A | 12/1998 | Northrup | 395/200.33 |
| 5,861,883 A | 1/1999 | Cuomo et al. | 345/326 |
| 5,862,325 A | 1/1999 | Reed et al. | 395/200.31 |
| 5,867,714 A | 2/1999 | Todd et al. | 395/712 |
| 5,870,610 A | 2/1999 | Beyda | 395/712 |
| 5,920,725 A * | 7/1999 | Ma et al. | 717/171 |
| 5,970,252 A * | 10/1999 | Buxton et al. | 717/11 |
| 5,974,454 A | 10/1999 | Apfel et al. | |
| 5,978,911 A * | 11/1999 | Knox et al. | 713/1 |
| 6,009,274 A * | 12/1999 | Fletcher et al. | 395/712 |
| 6,038,601 A * | 3/2000 | Lambert et al. | 709/226 |
| 6,058,445 A * | 5/2000 | Chari et al. | 710/103 |
| 6,073,214 A * | 6/2000 | Fawcett | 711/133 |
| 6,128,656 A * | 10/2000 | Matchefts et al. | 709/223 |
| 6,144,992 A * | 11/2000 | Turpin et al. | 709/208 |
| 6,151,643 A * | 11/2000 | Cheng et al. | 710/36 |
| 6,189,146 B1 * | 2/2001 | Misra et al. | 717/177 |
| 6,199,204 B1 * | 3/2001 | Donohue | 717/178 |
| 6,202,207 B1 * | 3/2001 | Donohue | 717/173 |
| 6,233,341 B1 * | 5/2001 | Riggins | 380/277 |
| 6,246,770 B1 * | 6/2001 | Stratton et al. | 380/281 |
| 6,253,240 B1 * | 6/2001 | Axberg et al. | 709/223 |
| 6,256,668 B1 * | 7/2001 | Slivka et al. | 709/220 |
| 6,263,364 B1 * | 7/2001 | Najork et al. | 709/217 |
| 6,314,565 B1 * | 11/2001 | Kenner et al. | 717/171 |
| 6,330,600 B1 * | 12/2001 | Matchefts et al. | 709/223 |
| 6,341,373 B1 * | 1/2002 | Shaw | 717/173 |
| 6,401,239 B1 * | 6/2002 | Miron | 707/203 |
| 6,463,433 B1 * | 10/2002 | Baclawski | 707/5 |
| 6,463,473 B1 * | 10/2002 | Gubbi | 709/225 |
| 6,496,875 B1 * | 12/2002 | Cheng et al. | 710/1 |
| 6,505,058 B1 * | 1/2003 | Willey | 455/574 |
| 6,512,954 B1 * | 1/2003 | Fox et al. | 607/31 |
| 6,535,490 B1 * | 3/2003 | Jain | 370/256 |
| 6,718,549 B1 * | 4/2004 | Narin et al. | 717/178 |
| 6,807,558 B1 * | 10/2004 | Hassett et al. | 709/203 |
| 6,871,221 B1 * | 3/2005 | Styles | 709/221 |

OTHER PUBLICATIONS

TITLE: Efficient Transparent Application Recovery in Client-Server Information Systems, author: Lomet et al, ACM, 1998.*

Barry Nance, "When Push Comes to Serve" BYTE, Jul. 1998, pp. 98-102.

Pete Loshin, "Tune In, Turn on the Web" BYTE, Feb. 1997, pp. 145-146.

Michael Fisk, "Automating the Administration of Heterogeneous LANs" USENIX Association—Proceedings of the Tenth Systems Administration Conference Sep.-Oct. 1996, pp. 181-186.

Peter W. Osel and Wilfried Gansheimer, "OpenDist—Incremental Software Distribution" USENIX Association—Proceedings of the Ninth Systems Administration Conference, Sep. 1995, pp. 181-193.

Atsushi Futakata, "Patch Control Mechanism for Large Scale Software" USENIX Association—Proceedings of the Ninth Systems Administration Conference, Sep. 1995, pp. 213-219.

Thomas Eirich, "Beam: A Tool for Flexible Software Update" LISA, Sep. 1994, pp. 75-82.

John Lockard and Jason Larke, "Synctree for Single Point Installation, Upgrades, and OS Patches" USENIX Association—Proceedings of the Twelfth Systems Administration Conference, Dec. 1998, pp. 261-270.

Ram R. Vangata, Michale Cripps and Raj G. Varadarajan, "Software Distribution and Management in a Networked Environment" USENIX Association—Proceedings of the Sixth Systems Administration Conference, Oct. 1992, pp. 163-170.

Bobby Krupczak, Kenneth L. Calvert and Mostafa Ammar, "Implementing Protocols in Java: The Price of Portability" IEEE Infocom '98, vol. 2, pp. 765-773.

Vinay Kanitkar and Alex Delis, "Real-Time Client-Server Push Strategies: Specification and Evaluation" IEEE Computer Society Technical Committee on Real-Time Systems, 1998, pp. 179-188.

Yun-Wu Huang and Philip S. Yu, "A Bandwidth-Sensitive Update Scheduling Method for Internet Push" IEEE Computer Society Technical Committee on Distributed Processing, May 1998, pp. 303-310.

Cliff Berg, "How Do I Create a Signed Castanet Channel?" Dr. Dobb's Journal, Jan. 1998, pp. 121-130.

Ling Liu, Calton Pu, Wei Tang, David Buttler, John Biggs, Tong Zhou, Paul Benninghoff, Wei Han and Fenghua Yu, "CQ: A Personalized Update Monitoring Toolkit" Sigmod'98—Proceedings of ACM SIGMOD International Conference on Management of Data, Jun. 1998, pp. 547-549.

* cited by examiner

SYSTEM AND METHOD FOR UPDATING INFORMATION VIA A NETWORK

BACKGROUND OF THE INVENTION

1. Field of the Invention

The field of the invention relates to transmitting computer programs and data to a computer via a network. More particularly, the invention relates to a system and method for updating computer programs and data over a computer network, the updating based upon client-specific information.

2. Description of the Related Art

In designing software, developers often need to customize computer programs to many varied hardware and software configurations, as well to other specific considerations. For example, computer programs are often customized toward a particular geographic speaking region. A computer user in France expects to see help menus and other information displayed in French instead of English. Further, for example, computer programs are often designed to operate under a particular operating system, or even a particular version of an operating system.

As improvements are made in a computer program, many of the users are interested in receiving and upgrading to the latest version of the computer program. With the advent of the Internet, it is now possible for users to almost instantaneously download and install such improvements on their computers.

Typically, the user visits an "update" server that hosts the improved computer programs. The update server presents to the user a list of the different versions of the computer programs that are available for installation. Due to the number of possible versions that are available for downloading, users are often confused and download the incorrect version of the requested software. Although the user may be able to readily identify that he is interested in a "French" version, the user may not know the version of an operating system. Another problem that is encountered is that even if the user knows which version is required for operation, the user may not know what other computer programs are required for proper operation of the upgrade. Disadvantageously, if the user chooses a version of computer program that is incompatible with his particular hardware and/or software configuration, possible damage can occur to the user's hardware and/or other software components.

Therefore, there is a need for a system and a method for automatically downloading an appropriate version of an computer program without user intervention. Further, the system and method should automatically determine the hardware and/or the software configuration of the client computer and select the appropriate version of the computer program.

SUMMARY OF THE INVENTION

The present invention has several aspects, no single one of which is solely responsible for its desirable attributes. Without limiting the scope of this invention as expressed by the claims which follow, its more prominent features will now be discussed briefly.

One embodiment of the invention includes a method of selecting components for installation on a computer, the method comprising receiving a request for the upgrade of one or more components, determining one or more system conditions regarding the computer, and identifying one or more components for installation on the computer based upon the request and the system conditions.

Another embodiment of the invention includes a computer system having a hardware and software configuration subject to change over time, the system comprising a first computer having one or more system resources, a second computer operably connected to the first computer, the second computer associated with one or more installable components, a configuration file that is readable by first computer, the configuration file identifying at least one of said one or more installable components, an upgrade manager executing on the first computer, the upgrade manager configured to transmit information about the system resources of the first computer to the second computer, and an upgrade handler executing on the second computer, the upgrade handler configured to transmit the location of one or more installable components from the second computer to the first computer based upon the contents of the configuration file and the system resources of the first computer.

Yet another embodiment of the invention includes a system for installing one or more components on a client computer, the system including a network, a client computer operably connected to the network, a configuration file identifying at least one of the components, a client computer for identifying or more client conditions, and a component server for receiving the client conditions and the configuration file from the client computer, the component server identifying the location of one or more components based upon the components identified by the configuration file and the client conditions.

Yet another embodiment of the invention includes a system for selecting components for installation on a computer, the system comprising means for receiving a request for the upgrade of one or more components, means for determining one or more system conditions regarding the computer, and means for identifying one or more components based upon the request and the system conditions.

Yet another embodiment of the invention includes a configuration file identifying one or more components for installation on a client computer, the configuration file comprising a plurality of component identifiers, each of the component identifiers identifying at least one of said one or more components, and an expiration time identifying a time by which the components must be installed in the client computer.

DETAILED DESCRIPTION OF THE PREFERRED EMBODIMENTS

Figure 1:
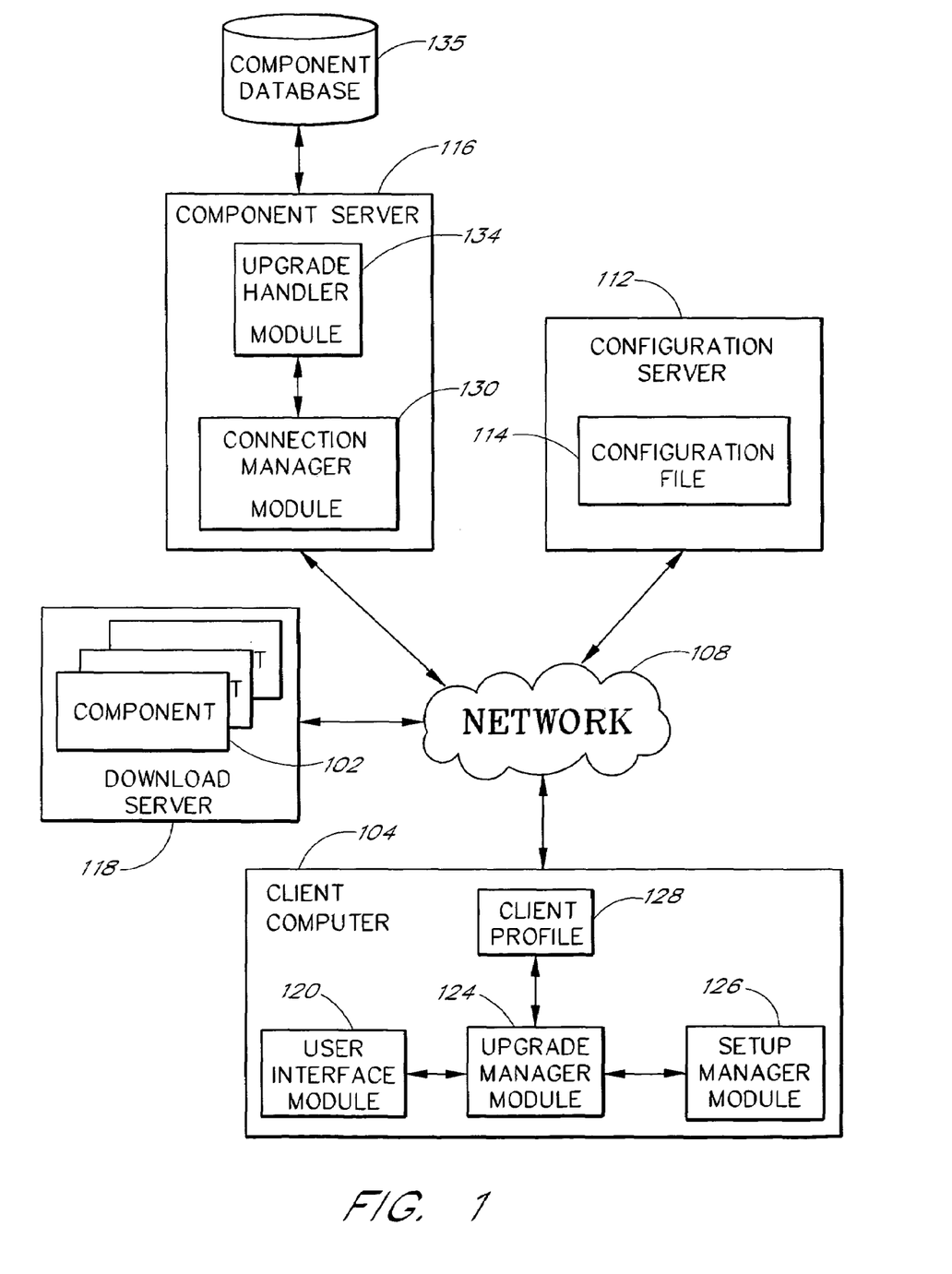
FIG. 1 is a high-level block diagram illustrating an architectural overview of one embodiment of the present invention for updating a client computer.

FIG. 1 is a high-level block diagram illustrating an architectural overview of one embodiment of the present invention. The system is configured to install one or more components 102 on a client computer 104. As used herein, the term "components" can include any item of executable code or data, or group of such items, that is capable of being processed by a computer. As a non-limiting example, the components 102 can include: a computer program, a DLL, an object code module, a data file, a text file, a Hyper Text Markup Language (HTML) file, a graphic or multimedia file, a streaming media file, or other such program and/or data. The components 102 may optionally be stored in compressed form. Further, although only one client computer 104 is shown in FIG. 1, the present invention is capable for installing the components 102 on a plurality of client computers 104 numbering in the tens of thousands and upwards.

The client computer 104 is connected via a network 108 to a configuration server 112. Furthermore, the client computer 104 and the configuration server 112 are operably connected to a component server 116. The component server 116 identifies the location of each the components 102 may be installed on a client computer 104. The client computer 104 is also connected via a network 108 to a download server 118. The download server 118 maintains the components 102.

Optionally, the configuration server 112, the component server 116, the download server 118, or some combination thereof, may be integrated on a single computer platform. Further, it is noted the configuration server 112, the component server 116, and the download server 118 may not necessarily be located in the same room, building or complex. In fact, the configuration server 112, the component server 116, and the download server 118 could be located in different states or countries.

The client computer 104, the configuration server 112, the component server 116, and the download server 118 may each have any conventional general purpose single- or multi-chip microprocessor such as a Pentium® processor, a Pentium® Pro processor, a 8051 processor, a MPS® processor, a Power PC® processor, or an ALPHA® processor. In addition, the microprocessor may be any conventional special purpose microprocessor such as a digital signal processor or a graphics processor. Furthermore, the client computer 104, the configuration server 112, the component server 116, and the download server 118 may be desktop, server, portable, hand-held, set-top, or any other desired type of configuration. Furthermore, the client computer 104, the configuration server 112, and the component server 116, and the download server 118 each may be used in connection with various operating systems such as: UNIX, LINUX, Disk Operating System (DOS), OS/2, Windows 3.X, Windows 95, Windows 98, and Windows NT.

The network 108 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). As used herein, the Internet includes network variations such as public internet, a private internet, a secure internet, a private network, a public network, a value-added network, an intranet, and the like.

The client computer 104 comprises a user interface module 120, an upgrade manager module 124, and a setup manager module 126. As can be appreciated by one of ordinary skill in the art, each of the modules 120, 124, and 126 comprise various sub-routines, procedures, definitional statements, and macros. In one embodiment of the invention, each of the modules 120, 124, and 126 are made available in a shareable dynamic link library. In another embodiment of the invention, each of the modules 120, 124, and 126 are separately compiled and linked into a single executable program. Therefore, the following description of each of the modules 120, 124, and 126 is used for convenience to describe the functionality of the client computer 104. However, the processes that are undergone by each of the modules 120, 124, and 126 may be arbitrarily redistributed to one of the other modules or combined together in a single module. Furthermore, the user interface module 120, the upgrade manager module 124, and the setup manager module 126 may be written in any programming language such as C, C++, BASIC, Pascal, Java, and FORTRAN. C, C++, BASIC, Pascal, Java, and FORTRAN are industry standard programming languages for which many commercial compilers can be used to create executable code.

The function of the modules in the client computer 104 is as follows. The user interface module 120 contains routines that for handling dialog boxes, message boxes, and other routines for presenting information to the user via a computer display (not shown). The upgrade manager module 124 handles the communication between the configuration server 112 and the component server 116. The upgrade manager module 124 also handles communication protocol, such as TCP/IP, between program servers, component downloading, and component authentication.

Furthermore, the upgrade manager module 124 determines the client conditions of the client computer 104 prior to downloading selected ones of the components 102. As used herein, the term "client conditions" includes, among other things: a preferred operating language, e.g., French, English, German, etc., the name of the operating system of the client computer 104, any version number that may be associated with the operating system, the existence of one or more other components of the client computer 104, and/or a user identification number. In one embodiment of the invention, the client conditions are permanently stored in a client profile 128. In another embodiment of the invention, the client profile 128 is dynamically generated upon each upgrade request by the user.

The setup manager module 126 handles the installation of the components 102 after the components are transmitted to the client computer 104. Furthermore, if necessary, the setup manager module 126 registers the downloaded components with the operating system on the client computer 104 and performs other installation housekeeping.

The configuration server 112 includes at least one configuration file 114. It is noted that the term "configuration server" is used for convenience to describe any computer that can maintain and transmit the configuration file 114. For example, the configuration server 112 can be any traditional "web server" that hosts media content for viewing by users. In one embodiment, the configuration server 112 includes a plurality of web pages that are viewable by a user at the client computer 104. The web pages are virtual documents that each have embedded links which link portions of the virtual pages to other virtual pages and other data. A user can traverse the virtual pages and download data by "clicking", with a mouse or other input device a predetermined portion of the virtual page.

According to this embodiment, at least one of the web pages includes a "download" hyperlink or icon that is associated with a configuration file 114. The configuration file 114 (FIG. 1) contains the configuration information for the installation of one or more components 102 on the client computer 104. For example, to advertise a word processing component, named "FOOBAR," a download hyperlink is displayed to the user "RECEIVE OUR LATEST PRODUCT, FOOBAR." If the user is interested in the FOOBAR component, the user can simply "click" on the phrase to download the configuration file 114 and initiate the download process.

In one embodiment of the invention, each of the configuration files 114 is associated with one of the components 102. The format of the configuration file 114 can be arbitrary, so long as it is readable by the client computer 104. One embodiment of the configuration file 114 is set forth below with reference to FIG. 2. The configuration file 114 is adapted such that it may be copied and stored on other computers. Advantageously, if one of the components 102 is freely distributed or is considered "shareware", the configuration file 114 that is associated with such component may be copied and distributed to others, and thereby enable others to download and install the software upon accessing the configuration file 114.

In one embodiment of the invention, before the configuration file 114 is transmitted from the configuration server 112 to the client computer 104, the configuration server 112 requests various items of information from the user for registration and demographic tracking purposes.

The component server 116 manages information about each of the components 102 that are installable on the client computer 104. To facilitate management and access to the information, the component information may be stored in a component database 135. In one embodiment of the invention, the components 102 are maintained on the component server 116. In another embodiment of the invention, the components 102 are maintained on one or more other component servers, such as the download server 118.

The component server 116 includes at least two modules: a connection manager module 130 and an upgrade handler module 134. Similar to the modules describes above with reference to the client computer 104, the processes that are undergone by each of the modules 130 and 134 may be arbitrarily redistributed to one of the other modules, combined together in a single module, or made available in a shareable dynamic link library. In summary, the function of the modules is as follows. The connection manager 130 handles communication with multiple client computers 104. The connection manager 130 packages requested information for transmission across the network 108. The upgrade handler 134 is in operable communication with the connection manager module 130. The upgrade handler 134 identifies components to be downloaded to the client computer 104 based upon the contents of the client profile 128 and the contents of the configuration file 114.

Figure 2:
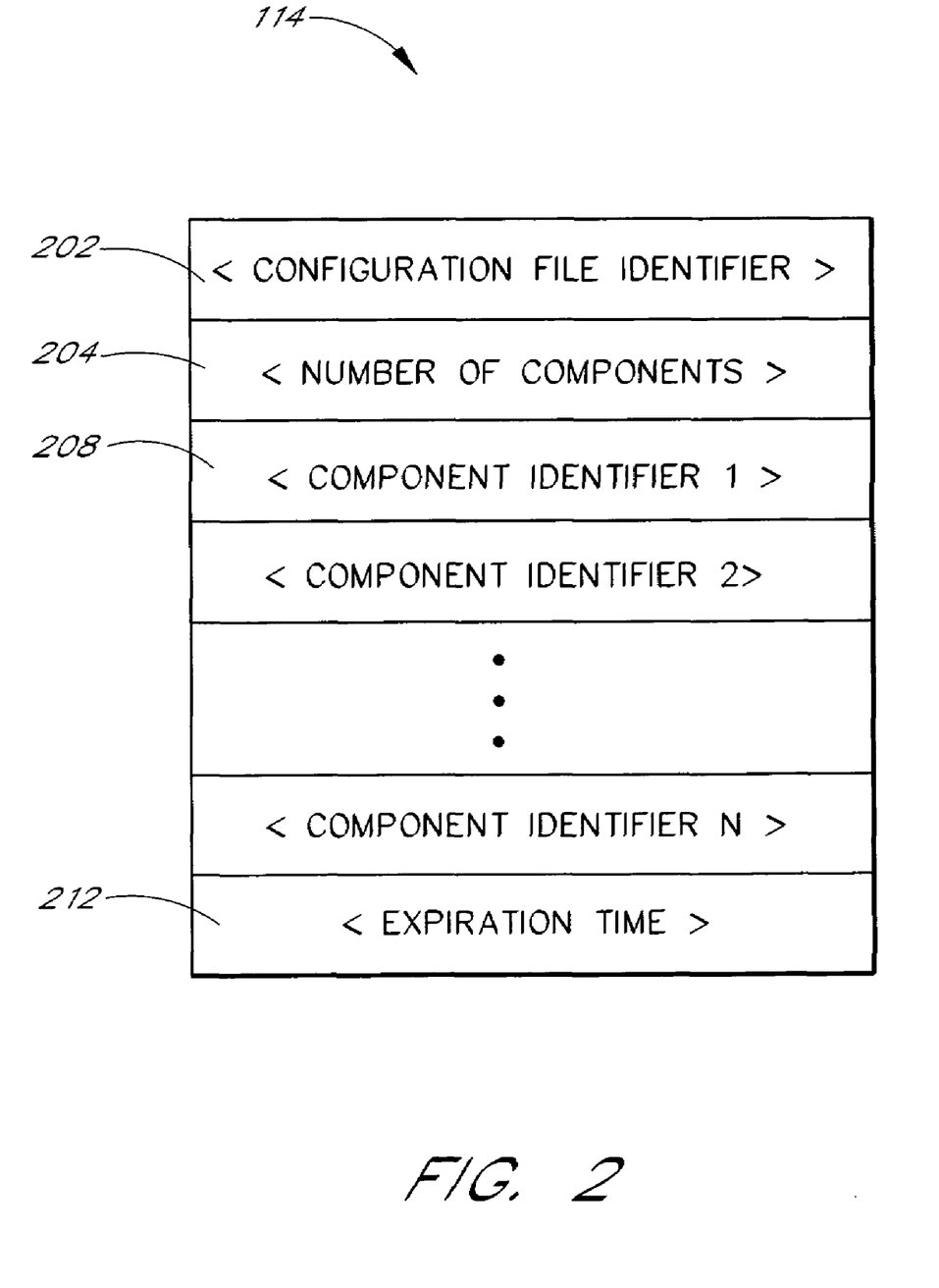
FIG. 2 is a block diagram illustrating a configuration file that is used to specify the components that are to be installed in the client computer shown in FIG. 1.

FIG. 2 is a block diagram illustrating the elements of one embodiment of the configuration file 114 (FIG. 1). The configuration file 114 identifies one or more components for downloading to the client computer 104 (FIG. 1). The configuration file 114 may be stored as any type of file, such as, for example: a text file, an HTML file, or a Java Archive (JAR) file. It will be appreciated by one of ordinary skill in the art that the configuration file 114 may contain other information or have a different format.

The configuration file 114 includes a configuration file identifier 202. The configuration file identifier 202 identifies the format of the remainder of the configuration file 114. In one embodiment of the invention, at least two types of configuration files exist: a client readable configuration file (CR file) and a server configuration file (SR file). The CR file is configured to be read by the upgrade manager module 124 (FIG. 1), which parses its contents, and subsequently requests the components from the component server 116. The SR file is not parsed by the client computer 104 (other than reading the configuration file identifier), but is instead forwarded unparsed to the component server 116. Advantageously, to be contrasted with the CR file, any changes in format of the SR file requires no corresponding change to the upgrade manager module 124 on each of the client computers 104. This feature is especially advantageous when used in a system having thousands of client computers and wherein the upgrade manager module 124 of each of the client computers would otherwise have to be upgraded.

The configuration file 114 also contains a number of components field 204 and one or more component identifiers 208. The number of components field 204 identifies the total number of component identifiers 208 that are contained within the configuration file 114. Each of the component identifiers 208 identifies one or more of the components 102 (FIG. 1). The configuration file 114 also includes an expiration time field 212. The expiration time field 212 contains a time by which the installation process must be completed, otherwise, the component server 116 refuses to complete the transaction. Since the configuration file 114 may be copied to other computers, the use of the expiration time can advantageously be used to limit the lifespan of the configuration file 114, and prevent others from hosting the configuration file 114.

Figure 3:
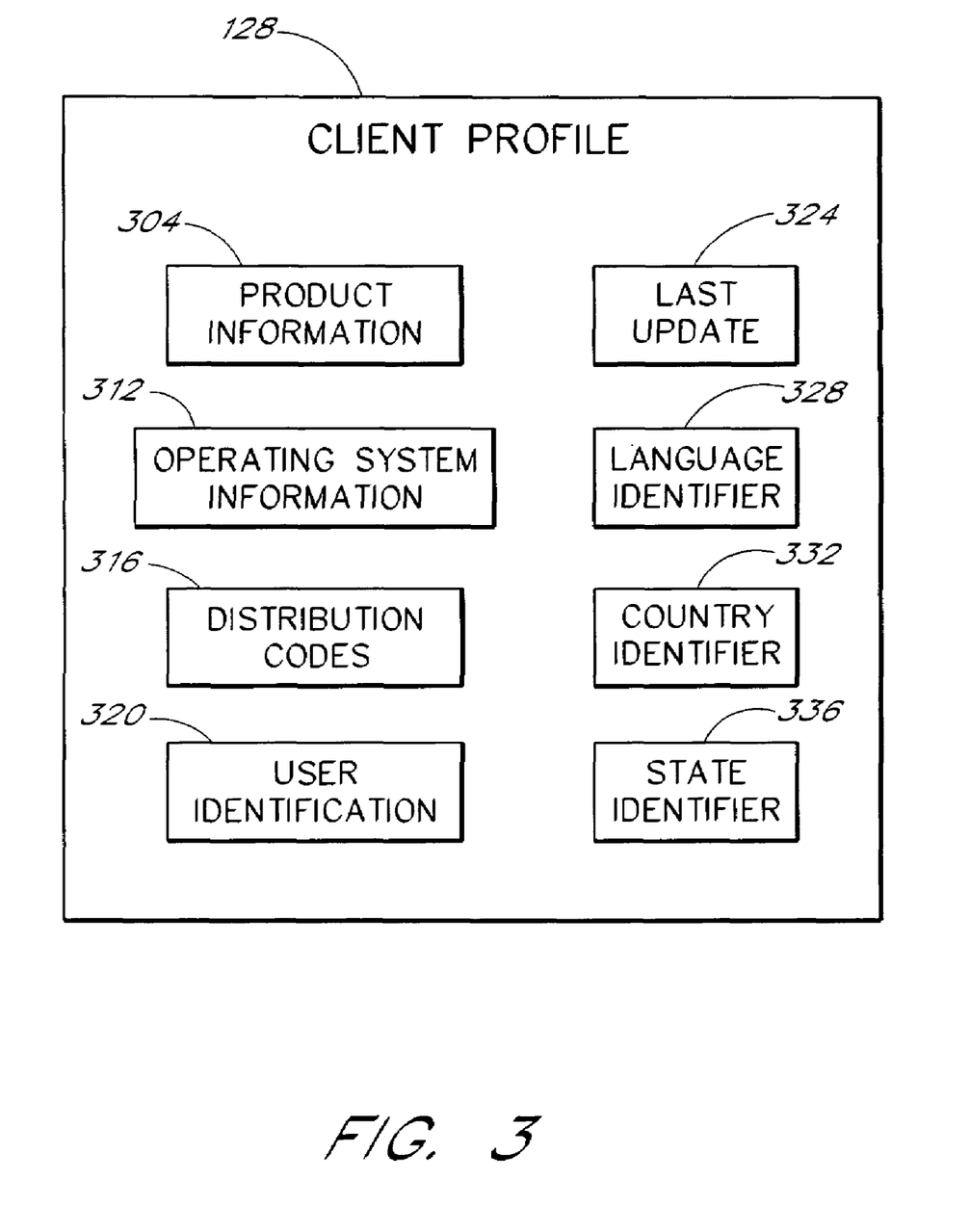
FIG. 3 is a block diagram illustrating a client profile that defines the client conditions of the client computer shown in FIG. 1.

FIG. 3 is a block diagram illustrating the contents of the client profile 128. The client profile 128 identifies client conditions, such that when one of the components 102 (FIG. 1) is designated for installation, a version of the component that is compatible with the client conditions may be selected. The client profile 128 includes a number of data field elements. The data field elements include: a product information field 304, an operating system information field 312, a distribution codes field 316, a user identification field 320, a last update field 324, a language identifier field 328, a country identifier field 332, and a state identifier field 336. It is noted that the data fields of the client profile are presented for exemplary purposes, and that selected data fields of the client profile 128 can be removed and that other data fields may optionally be added.

A description of each of the data fields in the client profile 128 is as follows. The production information field 304 contains product information about one or more components that are currently installed in the client computer 104 (FIG. 1). The product information may include a version number and a component serial number for each installed component. The operating system information field 312 identifies the type of operating system that is executing on the client computer 104 as well as any version information that is associated with the operating system. The distribution codes field 316 identifies the distributor of the currently installed components. The user identification field 320 contains a unique identifier that uniquely identifies the client computer

104. The last update field 324 contains a timestamp which identifies the last time the client computer 104 was updated.

The language identifier field 328 contains a language code that is associated with the client computer 104. For example, a language code of "1" can designate English, and a language code of "2" can designate French, and a language code of "3" can designate German. The country identifier field 332 identifies at least one country that is associated with the client computer 104. Lastly, the state identifier 336 designates one or more states that identify the client computer, e.g., California, Georgia, or Alaska.

METHOD OF OPERATION

Figure 4:
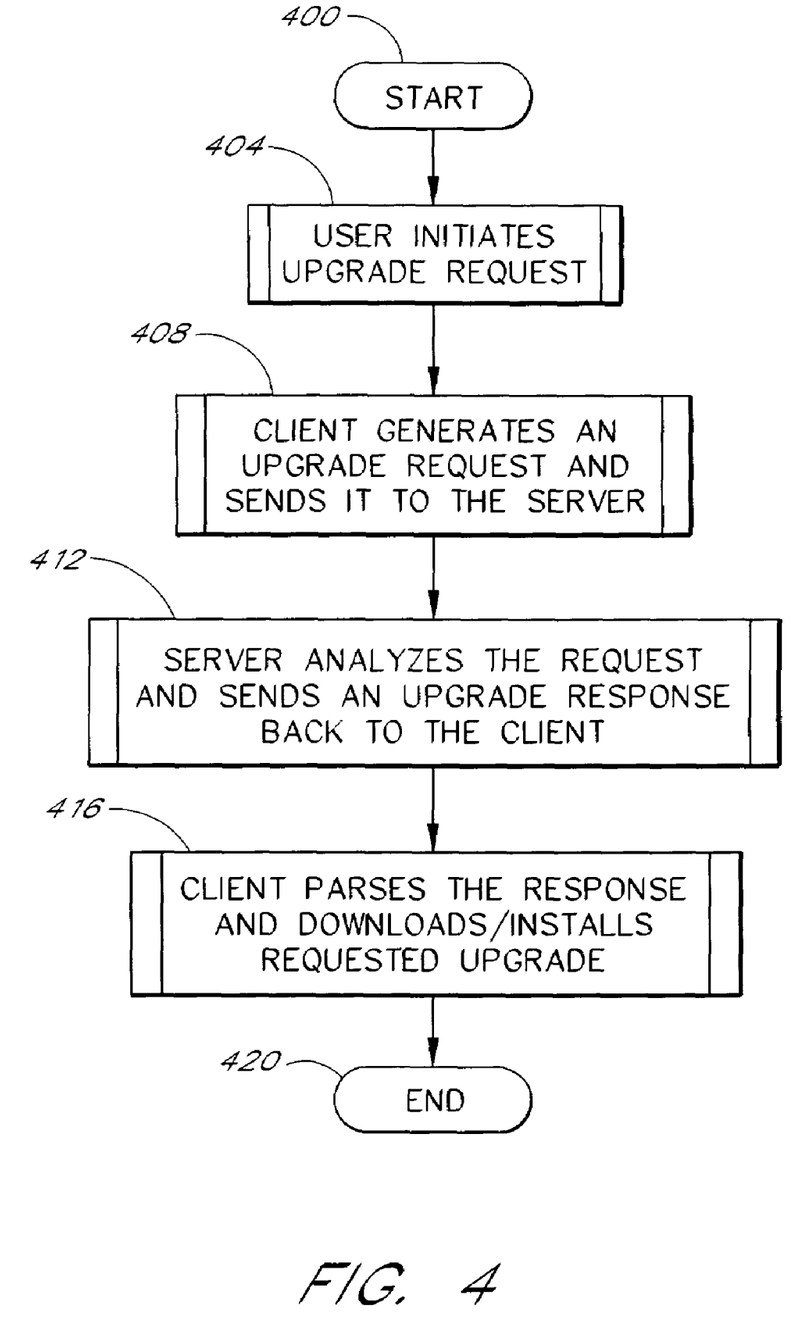
FIG. 4 is a high level flowchart illustrating a process for updating the client computer of FIG. 1, the process including receiving a user request, transmitting an upgrade request from the client computer to the server computer, analyzing the upgrade request, and installing one or more components identified in the upgrade request.

FIG. 4 is a flowchart illustrating a process for installing one or more components 102 on the client computer 104 (FIG. 1). After a starting at a step 400, the process moves to a step 404 wherein a user at the client computer 104 initiates an upgrade request. In one embodiment of the invention, at this step, the user accesses a configuration server 112 that is hosting one or more configuration files 114. The configuration server 112 includes a plurality of web pages, one of the pages having information about at least one of the components 102. In this embodiment, a portion of the screen display representing the component information is enabled as a hyperlink, and the user can click on the information that is hyperlinked to the configuration file 114 (FIG. 1). The clicking of the information causes the configuration server 112 to download the configuration file 114 to the client computer 104. However, it will be appreciated by one of ordinary skill that other methods exist for receiving the user upgrade request. For example, the user could type in the name of one or more of the components 102, or alternatively, using voice recognition software (not shown), verbally request one of the components 102.

Moving to a step 408, the client computer 404 generates an upgrade request which requests the location of one or more components. The process for generating an upgrade request is described below in further detail with reference to FIG. 5. However, in summary, the client computer 104 determines the client conditions and forwards the configuration file 114 and the client conditions to the component server 116. In one embodiment of the invention, the location of a component server 116 is specified in the configuration file 114. In another embodiment of the invention, the location of the component server 116 is predefined and stored by the upgrade manager module 124 (FIG. 1).

Continuing to a step 412, the component server 116 analyzes the upgrade request and sends an upgrade response message to the client computer 104 (FIG. 1). The process for analyzing the upgrade request is described below in further detail with reference to FIG. 6. However, in summary, the component server 116 uses the client conditions provided by the client computer 104 to determine an appropriate version of the component which was requested by the user. The component server 116 generates an upgrade response message which identifies the locations of the components requested by the client computer 104.

Next, at a step 416, the client computer 104 analyzes the upgrade response message to determine the location of requested components. Further, at this step, the client computer 104 downloads and installs the requested components. The process for downloading the requested components is described in further detail below with reference to FIG. 7. Moving to an end step 420, the installation process is complete.

Figure 5:
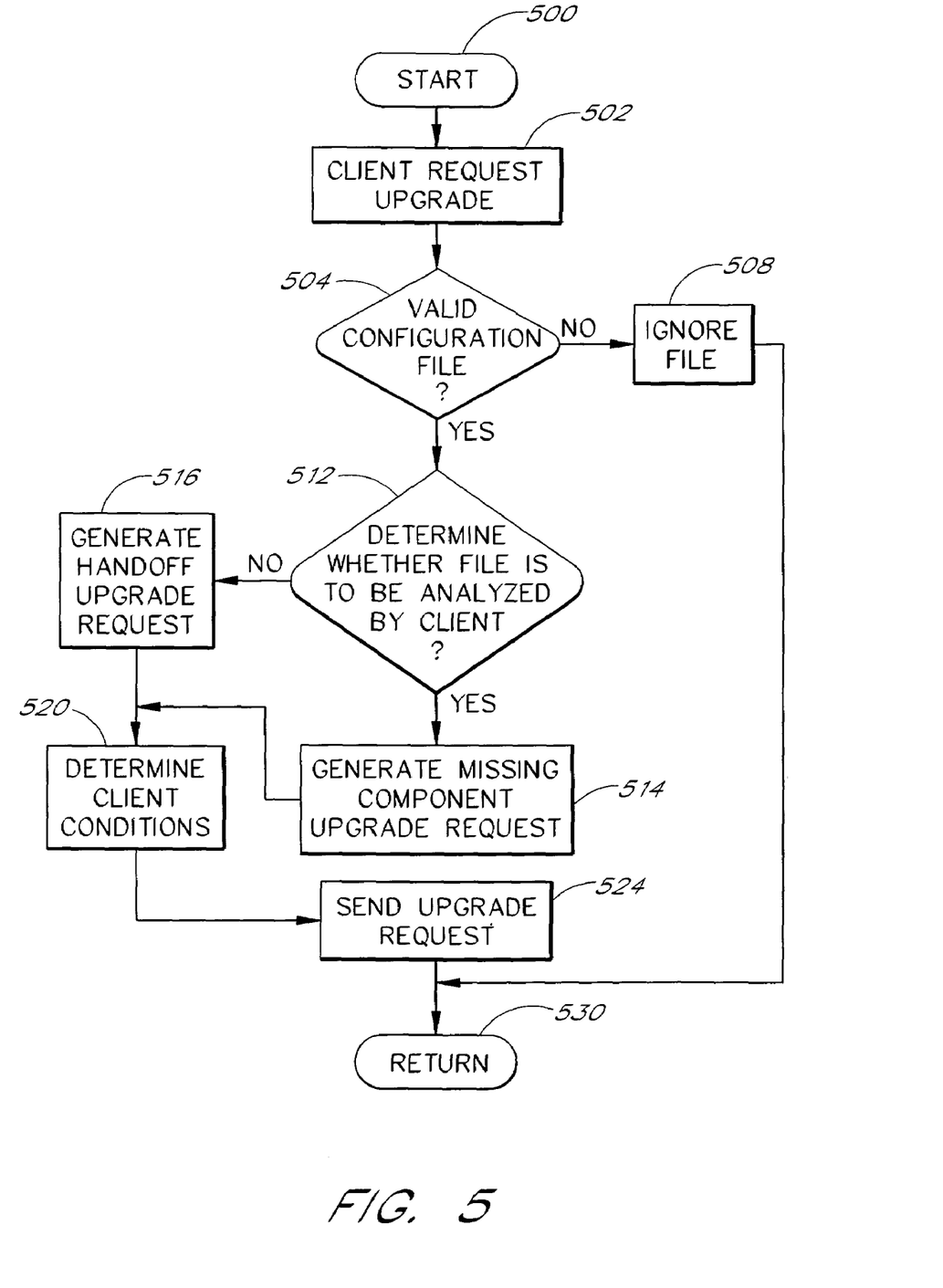
FIG. 5 is a flowchart illustrating in further detail the steps that occur in FIG. 4 with respect to transmitting the upgrade request.

FIG. 5 is a flowchart illustrating in further detail the process for transmitting an upgrade request message from the client computer 104 (FIG. 1) to the component server 116 (FIG. 1). FIG. 5 shows in further detail the acts that occur in step 408 of the embodiment described in relation to FIG. 4. From a start step 500, the client computer 104 proceeds to a next step 502, wherein a user at the client computer 104 (FIG. 1) requests one or more of the components 102 for downloading. Further, at the step 502, the configuration server 112 (FIG. 1) transmits the configuration file 114 (FIG. 1) to the client computer 104.

Continuing to a decision step 504, the upgrade manager module 124 (FIG. 1) determines whether the configuration file 114 is a valid configuration file 114 (FIG. 1). In one embodiment of the invention, the upgrade manager module 124 checks the validity of the configuration file 114 by examining configuration file identifier 202 (FIG. 2) in the configuration file 114. However, it will be readily appreciated by one of ordinary skill that other methods exist for determining the validity of the configuration file 114. If the upgrade manager module 124 determines that the configuration file 114 is not valid, for example, by determining that the configuration file identifier is of an unexpected value or format, the upgrade manager module 124 proceeds to a step 508. At the step 508, the upgrade manager module 124 stops processing the configuration file 114. The process flow then ends at a step 510.

Referring again to the decision step 504, if the upgrade manager module 124 (FIG. 1) determines that the configuration file 114 is valid, the upgrade manager module 124 proceeds to a decision step 512. At the decision step 512, the upgrade manager module 124 determines whether the configuration file 114 is to be analyzed by the client computer 104. In one embodiment of the invention, the upgrade manager module 124 determines whether the configuration file is to by analyzed by examining the configuration file identifier 202 (FIG. 2). If the upgrade manager module 124 determines that the configuration file is a CR file, i.e., readable by client computer 104, the upgrade manager module 124 proceeds to a step 514. At the step 514, the upgrade manager module 124 generates an upgrade request to the component server 116 (FIG. 1). The upgrade request identifies the components specified in the configuration file 114. Furthermore, the upgrade manager module 124 includes in the request the time stamp that is contained in the expiration time field 212 (FIG. 2).

However, referring again to the decision step 514, if the upgrade manager module 124 (FIG. 1) determines that the configuration file (FIG. 1) is a SR file, i.e., readable by the component server 116 (FIG. 1), the upgrade manager module 124, in a step 516, generates a handoff upgrade request to be sent to the component server 116. At this step, unlike it does with the CR file, the upgrade manager module 124 does not analyze the contents of the SR file (FIG. 1). Advantageously, if the format of the SR file 114 is modified, the upgrade manager module 124 does not have to be upgraded so that it understands the format modifications (so long as the configuration file identifier can be read), since the upgrade manager module 124 merely forwards the upgrade request to the component server 116. This feature is especially advantageous as tens of thousands of client computers would otherwise have to be upgraded upon each modification of the configuration file 114 format.

From either the step 514 or the step 516, the upgrade manager module 124 proceeds to a step 520. At the step 520, the upgrade manager module 124 determines the client conditions. As discussed above, the term "client conditions"

includes, among other things: a preferred language, the operating system of the client computer 104, the version of the operating system, the existence of one or more other components of the client computer 104, and/or a user identification number that is associated with the user.

In one embodiment of the invention, the client conditions are permanently stored in the client profile 128. In another embodiment of the invention, the client conditions are determined subsequent to each request by the user for one of the components 102. As will be appreciated by one of ordinary skill in the art, the client conditions can be obtained by a variety of methods. For example, in one embodiment of the invention, the user identification number can be a unique identifier that is associated with each upgrade manager module 124. In another embodiment of the invention, the user identification number can be a unique identifier that is associated with the microprocessor of the client computer 104. In yet another embodiment of the invention, the unique identifier is a unique identifier that is associated with the operating system of the client computer 104. As is seen from the foregoing examples, each of the client conditions may be derived from one or more of a variety of sources.

Proceeding to a step 524, the upgrade manager module 124 sends the upgrade request (generated in either the step 512 or the step 516) to the component server 116 (FIG. 1). In addition, the upgrade manager module 124 sends the client profile 128 to the component server 116. The process flow then ends at the step 510.

Figure 6:
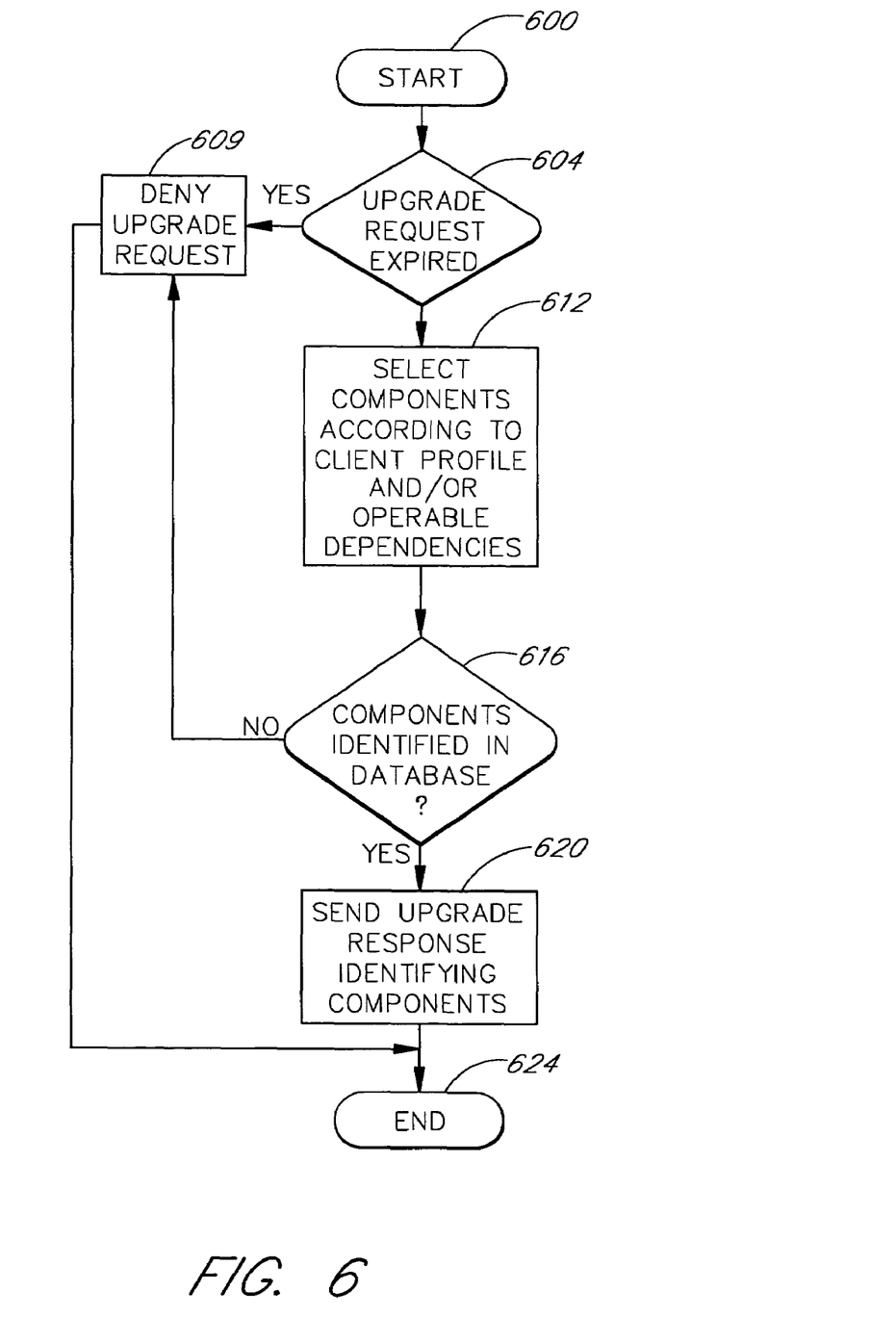
FIG. 6 is a flowchart illustrating in further detail the steps that occur in FIG. 4 with respect to analyzing the upgrade request.

FIG. 6 is a flowchart illustrating the process for responding to the upgrade request by the component server 116. FIG. 6 shows in further detail the acts that occur in step 412 of the embodiment described in relation to FIG. 4. At the step 600, the connection manager module 130 (FIG. 1) of the component server 116 (FIG. 1) has received an upgrade request from the client computer 104. Further, the connection manager module 130 has passed the upgrade request to the upgrade handler module 134 (FIG. 1).

From a start step 600, the upgrade handler module 134 proceeds to a decision step 604. At the decision step 604, the upgrade handler module 134 (FIG. 1) determines whether the upgrade request has expired. In one embodiment of the invention, the upgrade handler module 134 examines the timestamp that is included in the expiration time field (FIG. 2). In this embodiment, if the timestamp is earlier than the current time, the upgrade handler module 134 in the step 604 determines that the upgrade request has expired. If the upgrade request has expired, the upgrade handler module 134 proceeds to a step 608. At the step 608, the upgrade handler module 134 denies the upgrade request. The upgrade manager handler module 134 then sends a message to the client computer 104 to inform the client computer 104 that the request was denied. The process flow then proceeds to a end step 624 wherein the upgrade process is completed.

Referring again to the decision step 604, if the upgrade handler module 134 determines that the upgrade request has not expired, the upgrade handler module 134 proceeds to a step 612. At the step 612, the upgrade handler module 134 selects one or more of the components 102 for transmission to the client computer 104. The upgrade handler module 134 uses the client conditions to select components that are compatibly operable with the client computer 104. For example, the upgrade handler module 134 selects components and/or version of components 102 that are in a language which is preferred by the user, i.e., English, French, German.

In addition, the upgrade handler module 134 can optionally determine one or more additional components that are necessary for proper operation in addition to those components 102 requested by the client computer 104. For example, one of the requested components may be dependent on the existence of another component in the client computer 104 for proper operation. The upgrade handler module 134 can examine the client conditions to determine the existence of the necessary components, and if missing, supply these components in addition to the requested components. In one embodiment of the invention, the dependency information is stored in the component database 135. Further, the upgrade handler module 134 can identify other components that may be needed by the client computer 104.

Moving to a decision step 616, the upgrade handler module 134 (FIG. 1) determines whether the location of the requested components and those other computers that may be required can be identified in the component database 135 (FIG. 1). If the upgrade handler module 134 cannot identify the location of the selected components in the component database 135, the upgrade handler module 134 proceeds to the step 608 (discussed above) to deny the upgrade request. Otherwise, if the requested components are identified, the upgrade handler module 134 (FIG. 1) creates an upgrade response message to the client computer 104, identifying the location of the computers that are hosting the requested components. As was discussed above, in one embodiment of the invention, the components 102 may be stored on the component server 116. However, the components 102 may alternatively be stored one or more other server computers, such as the download server 118. The process flow then proceeds to the step 624 wherein the process 134 completes.

Figure 7:
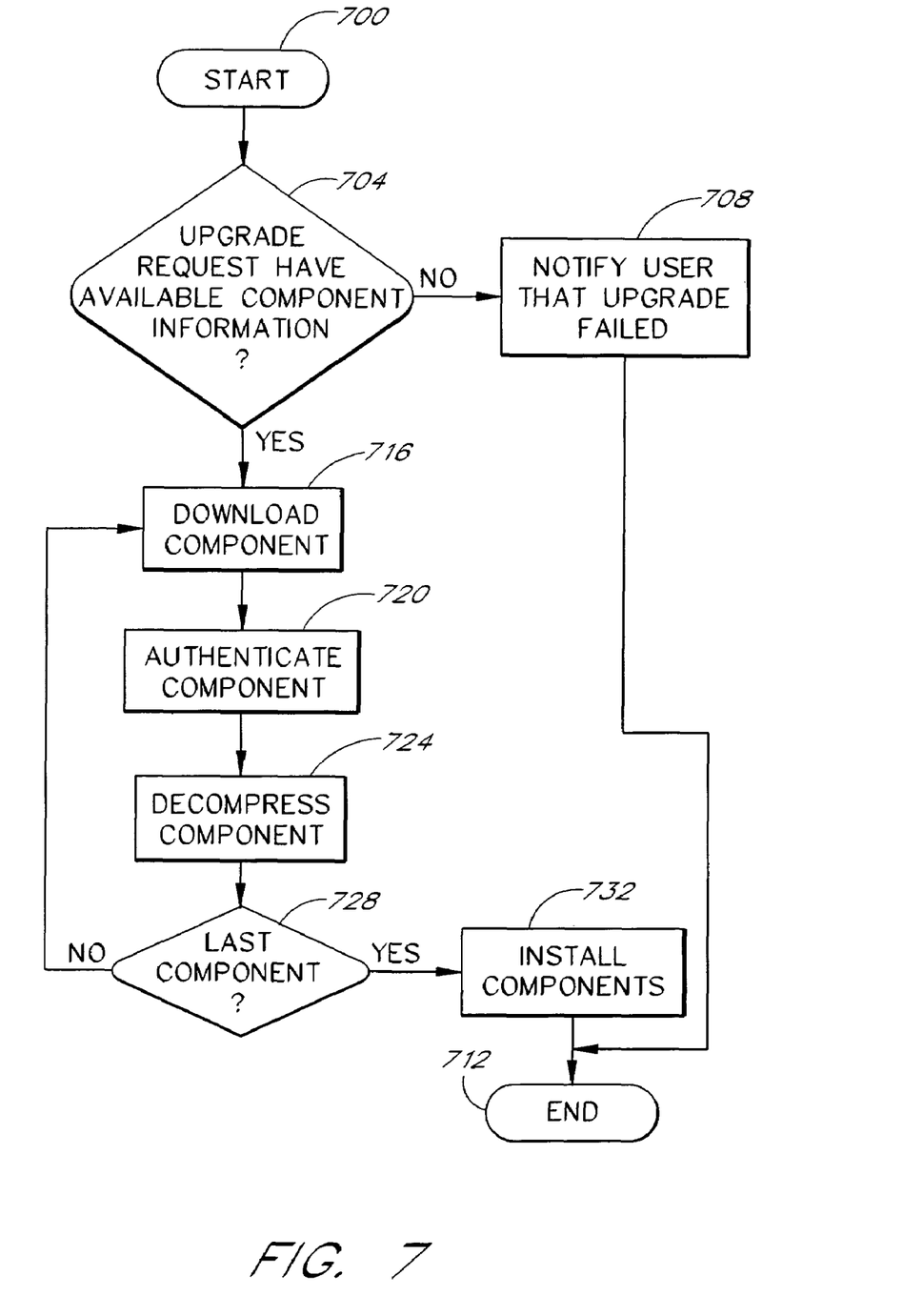
FIG. 7 is a flowchart illustrating in further detail the steps that occur in FIG. 4 with respect to installing the one or more components.

FIG. 7 is a flowchart illustrating the steps for installing the components that have been identified by the configuration server 112 (FIG. 1). FIG. 7 shows in further detail the acts that occur in step 416 of the embodiment described in relation to FIG. 4. At the step 700, the upgrade manager module 124 (FIG. 1) of the client computer 104 (FIG. 1) has received an upgrade response message from the component server 116.

Proceeding to a step 704, the upgrade manager module 124 (FIG. 1) analyzes the upgrade response message to determine whether the component server 116 was able to identify each of the requested components 102 (FIG. 1) and any other components that may be required for proper operation. If the upgrade manager module 124 determines that locations for all of the requested components could not be found, the upgrade manager module 124 proceeds to a step 708. At the step 708, the upgrade manager module 124 informs the user that upgrade failed. The process then ends in an end step 712.

Referring again to the decision step 704, if the upgrade manager module 124 determines that the upgrade request message has identified each of the components 102 (FIG. 1) including any necessary for proper operation, the upgrade manager module 124 proceeds to a step 716. During the steps 716, 720, 724, and 728, the upgrade manager module 124 performs an iterative process for downloading each of the components that have been identified by the component server 116. At the step 716, the upgrade manager module 124 downloads via the network 108 (FIG. 1) the first of the identified components. It will be appreciated by one of ordinary skill in the art that a number of methods exits for transmitting files across a network, e.g., HTTP, FTP, etc.

Continuing to a step 720, the setup manager module 124 authenticates the downloaded component. It is also to be appreciated that a number of methods exist for authenticating components. In one embodiment of the invention, the authentication process adheres to the Digital Signature Algorithm as defined by the National Institute of Standards and Technology (NIST). However, other forms of signature verification can be used such as ElGamal, Fiat-Shamir, or RSA.

Proceeding to a step 724, the upgrade manager module 124 decompresses the downloaded component. The present invention can be compatibly used with any off-the-shelf decompression, such as PKZIP by PKWARE Inc., the Universal Distribution Coder by Intelligent Compression Technologies, BZIP, or IMP by Technelysium. It is also to be appreciated that the upgrade manager module 124 can be used with a proprietary protection scheme.

Moving to a decision step 728, the upgrade manager module 124 determines whether the current component is the last component identified in the upgrade response message. If additional components need to be downloaded, the upgrade manager module 124 returns to repeat the steps 716, 720, 724, and 728 with respect to another one of the components.

However, still referring to the decision step 728, if the upgrade manager module 124 determines that the last component has been downloaded, the setup manager module 126 proceeds to a step 732. At the step 732, the setup manager module 126 installs each of the downloaded components. To install each of the components, the setup manager module 126 moves the components to an appropriate location in the client computer 104, e.g., by copying files. Furthermore, if necessary, the setup manager module 126 registers the downloaded component with a component registry (not shown) that is associated with operating system (not shown). The process flow then ends at the step 712.

The present invention advantageously allows users to upgrade software without knowing the hardware and/or software configuration of their computer. The system automatically downloads a software component and automatically selects the appropriate version of software that is compatible with the user's computer.

Further, the present invention allows for the association of an expiration time with the configuration files. If an expiration time is set, the component server can ensure that before a component is downloaded, the configuration file was recently supplied from a trusted configuration server. The use of the expiration time ensures that the user provides requested user information to the configuration server, and that the user did not get the configuration file from another computer outside of the control of the provider of the components.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A computing device implemented method of selecting software components for installation on a client computing device, the method comprising:
   receiving, from the client computing device, a request for an upgrade of a first software component capable of being processed by the client computing device;
   receiving configuration information indicating a software configuration of the client computing device and indicating at least one additional software component necessary for post-upgrade execution of the first software component, the at least one additional software component being determined to be missing from the client computing device;
   identifying second software components for installation on the client computing device based at least in part upon the request and the configuration information, the second software components comprising:
   the upgrade of the first software component, and
   the at least one necessary additional software component determined to be missing from the client computing device and necessary for post-upgrade execution of the first software component; and
   transmitting the second software components to the client computing device.

2. The method of claim 1, additionally comprising the act of receiving a configuration file that is associated with the request for the upgrade, the configuration file identifying at least said first software component.

3. The method of claim 2, wherein the configuration file has an associated expiration time.

4. The method of claim 3, additionally comprising:
   determining whether the expiration time indicates that the configuration file has expired; and
   stopping said identifying upon the determination that the configuration file has expired.

5. The method of claim 2, additionally comprising
   reading only an identifier in the configuration file; and
   sending at least a portion of the configuration file to a component server.

6. The method of claim 2, additionally comprising: sending at least a portion of the configuration file to a component server, the component server performing said identifying.

7. The method of claim 2, additionally comprising
   reading an identifier in the configuration file; and
   sending at least a portion of the configuration file to a component server.

8. The method of claim 2, additionally comprising storing the configuration file on a configuration server.

9. The method of claim 1, wherein the software configuration includes one or more computer-readable modules on the client computing device.

10. The method of claim 1, wherein the software configuration includes a language that is associated with one or more computer-readable modules on the client computing device.

11. The method of claim 1, wherein the software configuration includes a type of operating system that is executing on the client computing device.

12. The method of claim 1, additionally comprising:
    identifying one or more programs upon receiving the request, the one or more programs being associated with said first software component.

13. The method of claim 1, wherein the upgrade of the first component comprises a replacement of the first component.

14. A computer system having a configuration subject to change over time, the computer system comprising:
    a first computer having one or more system resources;
    a second computer operably coupled with the first computer via a network, the second computer associated with one or more installable components and operative to receive a request for an upgrade of one or more components from the first computer;

a configuration file that is readable by the first computer, the configuration file identifying at least one component on the first computer to be upgraded;

an upgrade manager executing on the first computer, the upgrade manager operative to transmit the configuration file and information about the system resources of the first computer to the second computer, the information including indications of components of an operating system that are executable by the first computer; and an upgrade handler executing on the second computer, the upgrade handler operative to identify installable components based upon the at least one component to be upgraded in the configuration file and the system resources of the first computer, the upgrade handler operative to transmit to the first computer software components comprising:

the at least one component to be upgraded and one or more components to be executed along with the operating system that are necessary for execution of the at least one component on the first computer after the at least one component has been upgraded, but missing on the first computer before the at least one component is upgraded.

15. The computer system of claim 14, wherein the configuration file is formatted for access by the upgrade handler.

16. The computer system of claim 14, wherein the configuration file has an associated expiration time.

17. The computer system of claim 14, wherein the upgrade manager retrieves the configuration file without parsing contents of the configuration file and wherein the upgrade manager transmits the configuration file to the upgrade handler.

18. The computer system of claim 14, wherein the upgrade manager parses the content of the configuration file and transmits the content to the upgrade handler.

19. The computer system of claim 14, additionally comprising a network, the first computer being in operable communication with the second computer via the network.

20. The computer system of claim 14, wherein the upgrade of the one or more components comprises replacement(s) of the one or more components.

21. A computer system for selecting components for installation on a client computing device, the system comprising:

means for receiving, from a client computing device via a network, a request to upgrade one or more non-operating system components of the client computing device;

means for determining one or more system conditions regarding the client computing device, the system conditions including a type of operating system that is executing on the client computing device;

means for identifying components to be installed on the client computing device before upgrading the one or more components of the client computing device, the identifying being based upon the request and the system conditions including the type of operating system that is executing on the client computing device, and the identified components comprising the non-operating system component(s) to be upgraded and one or more components of the operating system necessary for post-upgrade execution of the non-operating system components, but missing on the client computing device; and transmitter adapted to transmit the identified components to the client computing device via the network.

22. The system of claim 21, additionally comprising means for receiving a configuration file that is associated with the request for upgrade, the configuration file identifying the one or more components to be upgraded.

23. The system of claim 22, additionally including means for associating an expiration time with the configuration file.

24. The system of claim 23, additionally comprising:

means for determining whether the expiration time indicates that the configuration file has expired; and means for stopping the means for identification upon a determination that the configuration file has expired.

25. The method of claim 22, additionally comprising means for sending the configuration file to a component server, the component server including the means for identifying.

26. The system of claim 22, additionally comprising means for sending at least a portion of the configuration file to a component server, the component server including the means for identifying.

27. The system of claim 22, additionally comprising means for storing the configuration file on a configuration server.

28. The system of claim 21, wherein the system conditions include one or more computer readable modules on the client computing device.

29. The system of claim 21, wherein the system conditions include a language that is associated with one or more computer-readable modules that reside on the client computing device.

30. The system of claim 21, wherein the system conditions include the type of operating system that is executing on the client computing device.

31. The system of claim 21, additionally comprising means for identifying one or more program files upon receiving the request, the one or more program files being associated with at least one of said one or more components to be upgraded.

32. A method of selecting components for installation on an electronic device, the method comprising:

receiving via a network, a request to upgrade first one or more components of the electronic device;

identifying second components for installation on the electronic device based upon the request and system conditions of the electronic device wherein the system conditions including a characteristic of the operating system that is being executed on the electronic device, the second components comprising:

one or more component(s) to be upgraded, and at least one component to be executed with an operating system necessary for post-upgrade execution of the upgraded components on the electronic device, but missing on the electronic device before the one or more components are upgraded; and;

transmitting the identified second components to the electronic device via the network.

33. The method of claim 32, additionally comprising receiving a configuration file that is associated with the request for upgrade, the configuration file identifying said first one or more components.

34. The method of claim 33, additionally comprising sending the configuration file to a component server, the component server performing the identifying.

35. The method of claim 33, additionally comprising sending at least a portion of the configuration file to a component server, the component server performing the identifying step.

36. The method of claim 32, additionally comprising associating an expiration time with the configuration file.

37. The method of claim 36, additionally comprising:
determining whether the expiration time indicates that the configuration file has expired; and
stopping the identification step upon the determination that the configuration has expired.

38. The method of claim 32, wherein the upgrade of the one or more components comprises upgrade of one or more components associated with digital signal processing.

39. A computer system for selecting components for installation, the computer system comprising:
a server computer having a processor, a computer-readable storage medium and data communication subsystem; and
an upgrade handler residing in the computer-readable storage medium and being executed on the server computer, the upgrade handler configured to identify components upon receiving via the data communication subsystem one or more system conditions of a client computing device and a request to upgrade one or more non-operating system components of the client computing device, the system conditions including indications about an operating system that is executing on the client computing device, the identified components including, but not limited to, the component(s) to be upgraded and one or more non-operating system components of an operating system that are necessary for post-upgrade execution of the non-operating system components on the client computing device but missing on the client computing device before the components are upgraded, the identifying of the components being based at least in part on the received one or more system conditions and the request to upgrade, and the upgrade handler informing either client computing device or another computer system of the identified components to allow the other computer system to transmit the identified components to be installed on the client computing device.

40. The system of claim 39, wherein the client conditions include a user identification number that is associated with the user.

41. The system of claim 39, wherein the client conditions include a preferred language.

42. The computer system of claim 39, wherein the upgrade of the one or more components comprises upgrade of one or more components associated with digital signal processing.

43. A computer implemented method of selecting components for installation on a client electronic device, the method comprising:
determining one or more system conditions regarding the electronic device, the system conditions including one or more operating system components that are being executed on the electronic device;
transmitting a request to upgrade one or more non-operating system components of the electronic device to a server computer via a network, the request to upgrade including the determined system conditions of the electronic device; and
receiving the requested upgrades and additional components, the additional components including, but not limited to, one or more components with an operating system that are necessary for post-upgrade execution of the non-operating system components on the client computer but missing on the client computer pre-upgrade; and
installing the received components on the client computer.

44. The method of claim 43, additionally comprising:
receiving a configuration file i related to the one or more components of the client computer to be upgraded.

45. The method of claim 44, further comprising associating an expiration time with the configuration file.

46. The method of claim 45, further comprising:
determining whether the expiration time indicates that the configuration file has expired.

47. The method of claim 44, additionally comprising:
sending the configuration file to a component server to identify one or more of the components.

48. The method of claim 44, additionally comprising:
sending at least a portion of the configuration file to a component server to identify one or more of the components.

49. A client computing device comprising:
a processor, a computer-readable storage medium and data communication subsystem; and
an upgrade manager stored on the computer-readable storage medium and operable to:
retrieve via the data communication subsystem a configuration file identifying one or more software components for which an upgrade is available for download,
store the configuration file in the computer-readable storage medium,
identify one or more client conditions that are associated with the client computing device, the client conditions including features of an operating system that is executing on the client computing device,
generate an upgrade request that includes at least a portion of the configuration file and the client conditions including a type of the operating system that is executing on the client computing device,
transmit the upgrade request to one or more of a plurality of server computers, and
in response, receive a plurality of components comprising non-operating system component(s) identified in the configuration file as having an upgrade available and at least one component of the operating system necessary for post-upgrade execution of the non-operating system component(s), but missing on the client computing device pre-upgrade, the received components being provided to the client device based upon the included portion of the configuration file and a type of the operating system that is being executed on the client computing device.

50. The client computing device of claim 49, wherein the one or more of a plurality of server computers are identified by the configuration file.

51. The client computing device of claim 49, wherein the configuration file identifies one or more streaming media associated components for which an upgrade is available for download.

* * * * *